United States Patent
Zima

(10) Patent No.: US 12,248,470 B2
(45) Date of Patent: Mar. 11, 2025

(54) ANTICIPATORY PRE-EXECUTION OF DATA QUERIES

(71) Applicant: Google LLC, Mountain View, CA (US)

(72) Inventor: Colin Zima, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/451,032

(22) Filed: Aug. 16, 2023

(65) Prior Publication Data

US 2023/0401206 A1    Dec. 14, 2023

Related U.S. Application Data

(63) Continuation of application No. 17/811,720, filed on Jul. 11, 2022, now Pat. No. 11,755,574, which is a
(Continued)

(51) Int. Cl.
*G06F 16/2453*    (2019.01)
*G06F 9/48*    (2006.01)
(Continued)

(52) U.S. Cl.
CPC ...... *G06F 16/24539* (2019.01); *G06F 9/4881* (2013.01); *G06F 16/24564* (2019.01);
(Continued)

(58) Field of Classification Search
CPC ......... G06F 16/24539; G06F 16/24568; G06F 16/2477; G06F 16/24564; G06F 16/248
(Continued)

(56) References Cited

U.S. PATENT DOCUMENTS

| 7,693,813 B1 | 4/2010 | Cao et al. |
| 7,702,614 B1 | 4/2010 | Shah et al. |
| (Continued) | | |

FOREIGN PATENT DOCUMENTS

KR    10-2015-0043338 A    4/2015

OTHER PUBLICATIONS

Office Action for the related KR application No. 10-2023-7008147 dated Jul. 5, 2023.
(Continued)

*Primary Examiner* — Shahid A Alam
(74) *Attorney, Agent, or Firm* — Honigman LLP; Brett A. Krueger

(57) ABSTRACT

Implementations of the disclosure provide for anticipatory pre-execution of queries. In an implementation of the disclosure, a method for anticipatory pre-execution of queries includes the computation of an execution cost of each of a multiplicity of different queries to a data source scheduled at a specified time on a specified date. The method also includes monitoring a querying processing schedule and detecting from the monitoring, unscheduled time on a particular date prior to the specified time on the specified date. Finally, the method includes responding to the detection by first selecting a most expensive one of the different queries in terms of execution cost, for instance an amount of computing resources consumed in executing a corresponding one of the different queries, and then executing the selected most expensive one of the different queries during the unscheduled time on the particular date prior to the specified time on the specified date.

14 Claims, 2 Drawing Sheets

Related U.S. Application Data continuation of application No. 16/989,827, filed on Aug. 10, 2020, now Pat. No. 11,409,740.

(51) Int. Cl.
 *G06F 16/2455* (2019.01)
 *G06F 16/2458* (2019.01)
 *G06F 16/248* (2019.01)

(52) U.S. Cl.
 CPC .... *G06F 16/24568* (2019.01); *G06F 16/2477* (2019.01); *G06F 16/248* (2019.01)

(58) Field of Classification Search
 USPC .................................................. 707/713, 748
 See application file for complete search history.

(56) References Cited

U.S. PATENT DOCUMENTS

| | | | |
|---|---|---|---|
| 7,925,655 B1 | 4/2011 | Power et al. | |
| 8,086,594 B1 * | 12/2011 | Cao | G06F 16/313 |
| | | | 707/713 |
| 8,166,021 B1 * | 4/2012 | Cao | G06F 16/313 |
| | | | 707/748 |
| 8,166,045 B1 * | 4/2012 | Mazumdar | G06F 16/951 |
| | | | 707/748 |
| 9,558,250 B2 | 1/2017 | Sun et al. | |
| 2005/0010558 A1 | 1/2005 | Dettinger et al. | |
| 2005/0235004 A1 * | 10/2005 | Folkert | G06F 16/2393 |
| 2006/0080285 A1 | 4/2006 | Chowdhuri | |
| 2011/0145392 A1 | 6/2011 | Dawson et al. | |
| 2017/0039239 A1 | 2/2017 | Saadat-Panah et al. | |
| 2019/0311447 A1 | 10/2019 | Strnad, II | |

OTHER PUBLICATIONS

Indian Examination Report for the related Application No. 202347014291, dated Aug. 2, 2023, 6 pages.

* cited by examiner

ANTICIPATORY PRE-EXECUTION OF DATA QUERIES

CROSS REFERENCE TO RELATED APPLICATIONS

This U.S. patent application is a continuation of, and claims priority under 35 U.S.C. § 120 from, U.S. patent application Ser. No. 17/811,720, filed on Jul. 11, 2022 which is a continuation of U.S. patent application Ser. No. 16/989,827, now U.S. Pat. No. 11,409,740, filed on Aug. 10, 2020. The disclosures of these prior applications are considered part of the disclosure of this application and are hereby incorporated by reference in their entireties.

TECHNICAL FIELD

This disclosure relates to the field of query scheduling and more particularly to the pre-scheduling of queries for execution before a requested query execution time.

BACKGROUND

A query is a request for information from an information retrieval system. There are three general methods for posing queries: menu driven, querying by example and query language formulation. In the first instance, a query is formulated and issued based upon the selection of parameters in a menu. In the second instance, the information retrieval system presents a blank record and allows the end user to specify the fields and values that define the query. In the third instance, the end user formulates the query utilizing a stylized query written in a query language. The latter is the most complex method because it requires the use of a specialized language, but the latter is also the most powerful as it is the least constrained mode of querying an information retrieval system.

Queries generally are issued either on demand through a query interface, or programmatically at the time of executing a computer program. But, queries also may be issued in batch mode. That is to say, a query may be specified at one time, but execution of the query against the information retrieval system may be deferred to a later time. In this regard, in an information retrieval system, it is common for multiple users to concurrently submit queries to the database for execution. Consequently, if the information retrieval system lacks sufficient computing resources to execute all of the submitted queries simultaneously, the information retrieval system must defer execution of one or more of those queries while only a subset of the queries may be processed immediately. The process of determining which queries to defer and at what time the deferred queries are to execute is known as query scheduling.

One way to perform query scheduling is to execute incoming queries in the order they arrive referred to as a "first-come-first-serve" approach. However, the first-come-first serve approach cannot differentiate between queries that have differing response time requirements, some queries being more time sensitive than others. If queries are simply scheduled according to order of arrival, some time-sensitive queries may be forced to wait behind time-insensitive queries, which can adversely affect the usability and responsiveness of the information retrieval system.

Query scheduling also may be performed according to fixed priority. In fixed priority scheduling, each query is assigned a priority based on one or more properties known at the time of query arrival such as the identity or type of the query requestor. Thereafter, each query may be scheduled according to an assigned priority. As can be seen, fixed priority scheduling avoids the problems of the first-come-first-serve approach since time-sensitive queries can be prioritized over less time-sensitive queries. Yet, fixed priority scheduling cannot account for "heavy" queries that take a relatively long time to execute and "light" queries that take a relatively short time to execute, such as on the order of milliseconds or seconds.

SUMMARY

Implementations of the present disclosure address deficiencies of the art in respect to query scheduling and provide a novel and non-obvious method, system and computer program product for anticipatory pre-execution of queries. In an implementation of the disclosure, a method for anticipatory pre-execution of queries includes the computation of an execution cost of each of a multiplicity of different queries to a data source scheduled at a specified time on a specified date. The method also includes monitoring a querying processing schedule and detecting from the monitoring, unscheduled time on a particular date prior to the specified time on the specified date. Finally, the method includes responding to the detection by first selecting a most expensive one of the different queries in terms of execution cost, for instance an amount of computing resources consumed in executing a corresponding one of the different queries, and then executing the selected most expensive one of the different queries during the unscheduled time on the particular date prior to the specified time on the specified date.

In one aspect of the disclosure, the different queries may be filtered to include only queries that are not reliant upon underlying data anticipated to be updated after the unscheduled time on the particular date and before the specified time on the specified date. In another aspect of the disclosure, the selection of the most expensive one of the different queries includes selecting not only a most expensive one of the different queries, but also one of the different queries least reliant upon a freshness of underlying data. In yet another aspect of the disclosure, the process step of monitoring the query processing schedule may detect repeated instances at the unscheduled time over several dates when no queries are scheduled, so as to detect the unscheduled time on the particular date prior to the specified time on the specified date. In even yet another aspect of the disclosure, a manually specified one of the different queries may be selected in lieu of the most expensive one of the different queries for execution during the unscheduled time on the particular date prior to the specified time on the specified date.

In another implementation of the disclosure, a query scheduling data processing system is configured for anticipatory pre-execution of queries. The system includes a host computing platform that includes one or more computers, each with memory and at least one processor, a data source coupled to the host computing platform and a query processor that has been adapted for executing queries based upon data disposed in the data source. The system yet further includes an anticipatory query pre-execution module. The module includes computer program instructions that execute in the memory of the host computing platform so as to compute an execution cost of each of a multiplicity of different queries to the data source scheduled at a specified time on a specified date, monitor a querying processing schedule, detect from the monitoring, unscheduled time on a particular date prior to the specified time on the specified date and respond to the detection by selecting a most expensive one of the different queries in terms of execution cost and directing the query processor to execute the selected most expensive one of the different queries during the unscheduled time on the particular date prior to the specified time on the specified date.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION OF DRAWINGS

The accompanying drawings, which are incorporated in and constitute part of this specification, illustrate implementations of the disclosure and together with the description, serve to explain the principles of the disclosure. The implementations illustrated herein are presently preferred, it being understood, however, that the disclosure is not limited to the precise arrangements and instrumentalities shown, wherein.

DETAILED DESCRIPTION

Implementations of the disclosure provide for anticipatory pre-execution of queries. In accordance with an aspect of the disclosure, an execution cost may be computed for each of a multiplicity of different queries to a data source scheduled at a specified time on a specified date. Then, a querying processing schedule may be monitored so that, unscheduled time may be detected from the monitoring with respect to a particular date prior to the specified time on the specified date. Thereafter, in response to the detection of the unscheduled time, a most expensive one of the different queries in terms of execution cost first may be selected and then executed during the unscheduled time on the particular date prior to the specified time on the specified date. In this way, the most expensive one of the different queries may be anticipatorily pre-executed at a time that otherwise would be wasted so as to gain efficiencies in the total execution cost of all of the queries scheduled for processing at the specified time on the specified date.

Figure 1:
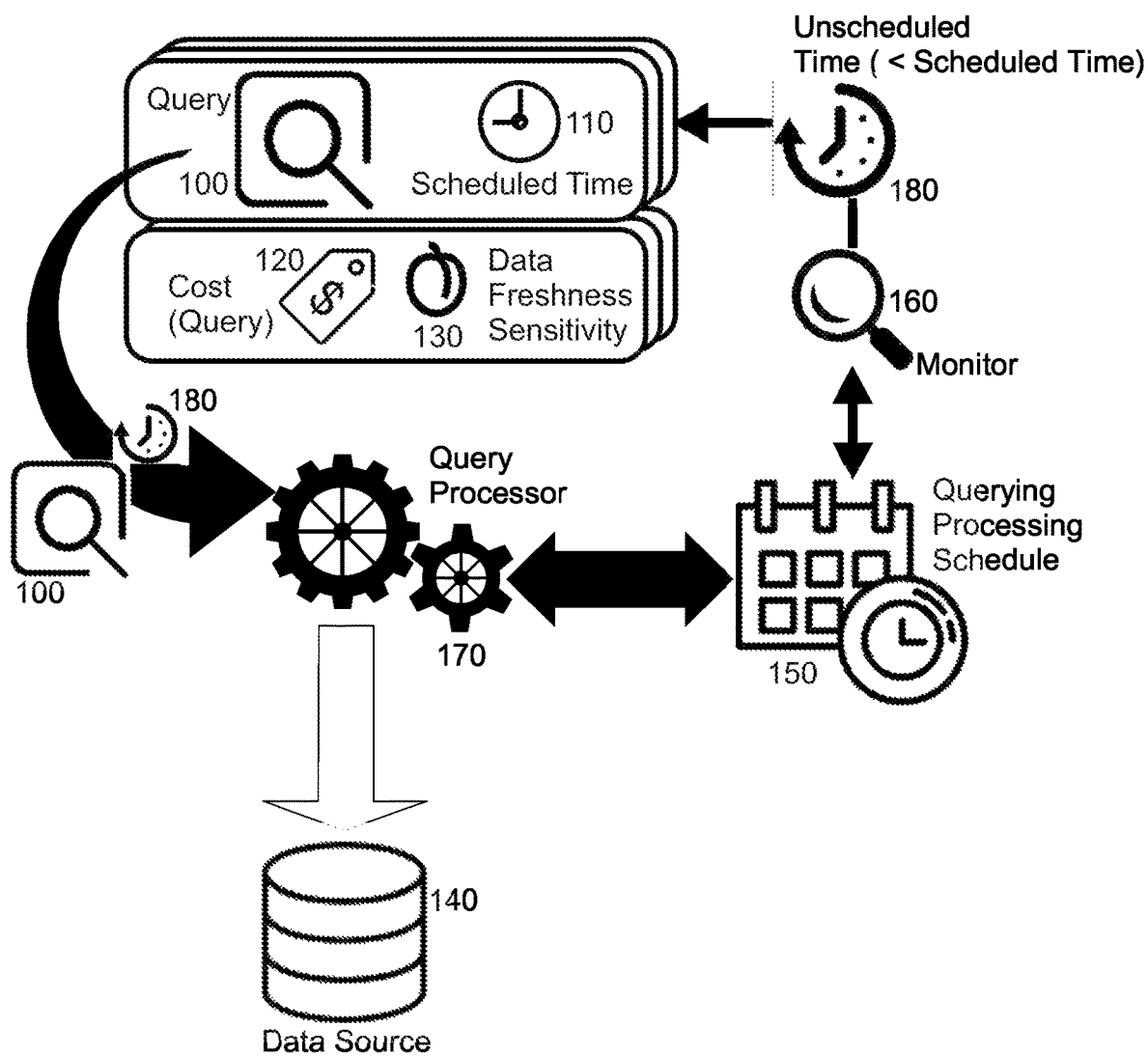
FIG. 1 is pictorial illustration of a process for anticipatory pre-execution of queries.

In further illustration, FIG. 1 pictorially shows a process for anticipatory pre-execution of queries. As shown in FIG. 1, a query processor 170 executes queries 100 against a data source 140, for instance a database or data model of data in one or more databases. The query processor 170 executes one or more of the queries 100 at different scheduled times 110 according to a query processing schedule 150 in which different queries are scheduled for execution against the data source 140 at the different scheduled times 110. Of import, each of the queries 100 is associated with meta-data defining the scheduled time 110 on a particular date when the corresponding one of the queries 100 is scheduled in a query processing schedule 150 for processing by the query processor 170. As well, each of the queries 100 is associated with meta-data specifying a cost of processing 120 in terms of the resource cost (processor and memory resources, for instance), and optionally, a sensitivity to data freshness value 130. The cost of processing 120 may be specified manually and directly in the meta-data, or the cost of processing 120 may be computed as a mathematical cost function accounting for several input parameters such as time to run, freshness sensitivity/elasticity and the likelihood of a requirement to re-run the query subsequently owing to an observed update in implicated records. Indeed, in one aspect of the disclosure, the parameters can be weighted differently as established by an administrator.

The sensitivity to data freshness value 130 indicates a reliance of a corresponding one of the queries 100 to underlying data that must be as current as possible to provide an accurate query result. For instance, reliance upon addressing data may be less sensitive than reliance upon daily sales information. In the former instance, may bear no impact if the corresponding one of the queries 100 pre-executes before the scheduled time 110 as addressing information is unlikely to change in the interim period of time between the time and date of pre-execution and the scheduled time 110. But, in the latter instance, pre-executing a corresponding one of the queries 100 may produce inaccurate results if the corresponding one of the queries 100 depends upon data which may change in the period of time between a corresponding scheduled time 110 and a time of execution before the scheduled time 110, such as sales data.

A monitor 160 monitors the query processing schedule 150 to identify for different time periods, whether or not any time is not scheduled for query processing or under-scheduled for query processing. Upon detecting available time 180, the monitor 160 inspects the queries 100 pending processing at times future from the available time 180 in order to identify ones of the queries 100 with a highest corresponding cost of processing 120. Thereafter, the monitor 160 selects an identified one of the queries 100 with a corresponding highest cost of processing 120 and re-schedules the selected one of the queries 100 for processing against the data source 140 by the query processor 170 at the detected available time 180. To the extent that multiple different ones of the queries 100 have similar corresponding costs 120 determined to be highest amongst all of the queries 100, one of the queries with the similar corresponding costs 120 is selected for pre-execution based upon a smallest corresponding data freshness sensitivity 130.

Figure 2:
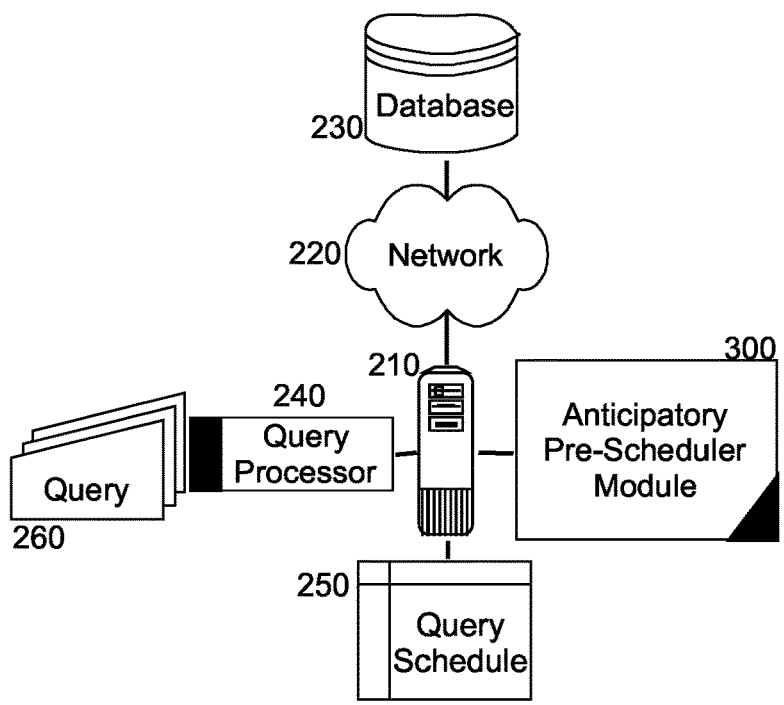
FIG. 2 is a schematic illustration of a data processing system configured for anticipatory pre-execution of queries; and, FIG. 3 is a flow chart illustrating a process for anticipatory pre-execution of queries.

The process described in connection with FIG. 1 may be implemented in a data processing system. In further illustration, FIG. 2 schematically shows a data processing system configured for anticipatory pre-execution of queries. The system includes a host computing system 210 that includes one or more computers, each with memory and at least one processor. The host computing system 210 is communicatively coupled across data communications network 220 to a database 230 and supports the operation of a query processor 240 adapted to execute different queries 260 against the database 230 according to a query schedule 250 specifying dates and times when the query processor 240 is to execute corresponding ones of the queries 260 against the database 230.

Importantly, an anticipatory pre-scheduler module 300 executes in the memory of the host computing system 210. The anticipatory pre-scheduler module 300 includes computer program instructions that during execution, permits the manual or automatic re-scheduling of one of the queries 260 to an earlier time slot known to be available based upon a monitoring of the query schedule 250. As to the automatic re-scheduling, the program instructions monitor the query schedule 250 to identify time periods during which unscheduled time exists without a query scheduled for processing by the query processor 240. To that end, the program instructions detect repeated instances of the unscheduled time over several dates when no queries are scheduled, so as to detect the unscheduled time on the particular date prior to the specified time on the specified date.

Upon detecting the unscheduled time, the program instructions are further enabled to select one of the queries 260 scheduled for execution at scheduled times subsequent to the unscheduled time that have a corresponding cost of execution recorded to be highest amongst all of the queries 260, or in the alternative, above a threshold value. The program code, optionally, selects from multiple ones of the queries 260 with corresponding costs above a threshold value, one of the queries 260 having a lowest recorded sensitivity to changes in underlying data upon which the query is dependent. Thereafter, the program instructions pre-schedule the selected one of the queries 260 for pre-execution at the available time.

Figure 3:
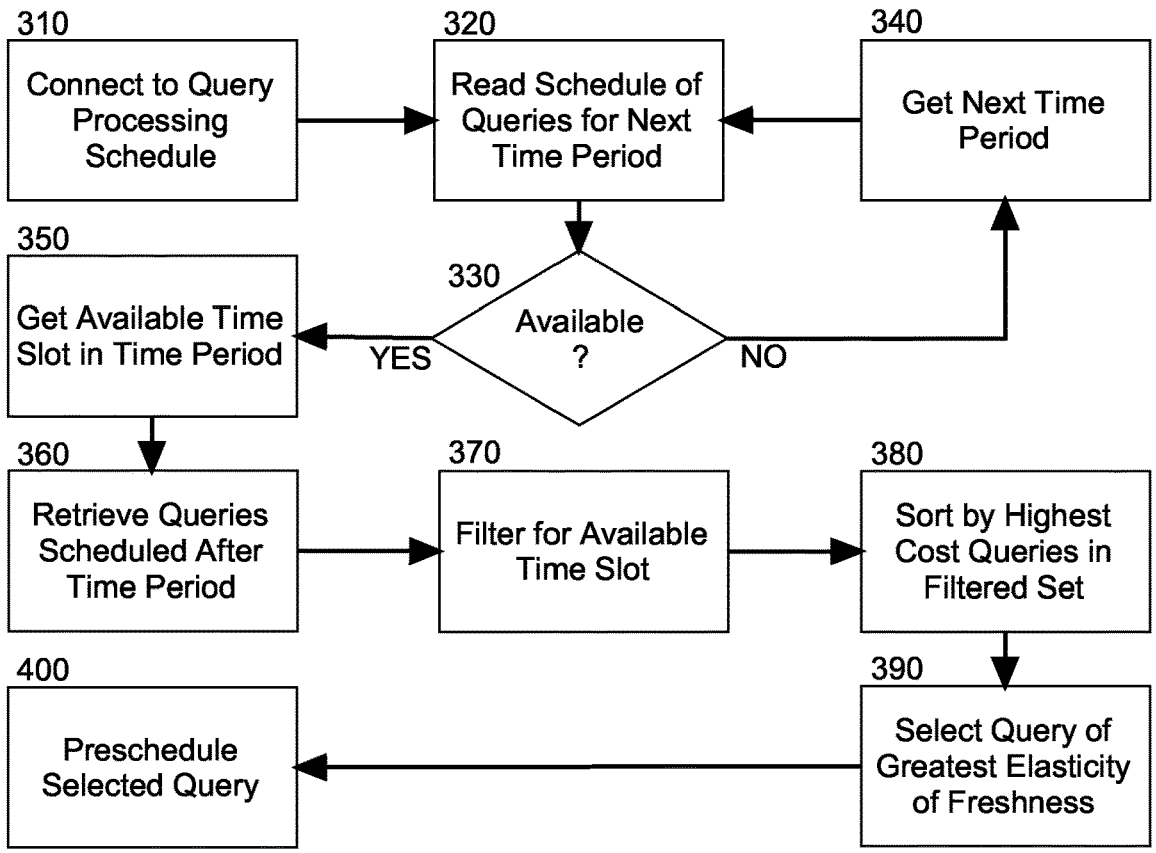

In even further illustration of the operation of the anticipatory pre-scheduler module 300, FIG. 3 is a flow chart illustrating a method 301 for anticipatory pre-execution of queries. Beginning in block 310, the module connects to the query processing schedule and in block 320, the module reads a schedule of queries scheduled for processing during a next time period. In decision block 330, the module determines if available time exists during the time period. If not, in block 340 the module selects a next time period and in block 320, the module reads a schedule for a next time period. Then, the process returns to decision block 330.

In decision block 330, if available time exists during the time period, in block 350 the module selects an available time slot in the time period and in block 360 the module retrieves queries scheduled for a future time period beyond the selected time period. In block 370, the retrieved queries are filtered to include only queries not reliant upon underlying data anticipated to be updated after the available time and before the specified time. In block 380, the filtered queries are sorted by cost of execution. Then, in block 390, beginning with the highest cost query, the module selects for pre-execution the query in the sort of least sensitivity to freshness of underlying data implicated by the query. Finally, in block 400, the module re-schedules the selected query for pre-execution at the available time.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The implementation was chosen and described in order to best explain the principles of the disclosure and the practical application, and to enable others of ordinary skill in the art to understand the disclosure for various implementations with various modifications as are suited to the particular use contemplated.

Having thus described the disclosure of the present application in detail and by reference to implementations thereof, it will be apparent that modifications and variations are possible without departing from the scope of the disclosure defined in the appended claims as follows:

What is claimed is:

1. A computer-implemented method executed by data processing hardware that causes the data processing hardware to perform operations comprising:
    monitoring a query processing schedule comprising a plurality of queries, each respective query of the plurality of queries:
        scheduled to execute against a database at a respective specified time; and
        comprising respective meta-data defining a respective attribute of the respective query, the meta-data indicating:
            a respective execution cost of the respective query; and
            a data freshness sensitivity of the respective query, the data freshness sensitivity indicating a reliance on freshness of corresponding data of the database queried by the respective query;
    detecting, based on the monitoring of the query processing schedule, a period of time in the query processing schedule where no queries are scheduled to execute;
    in response to detecting the period of time where no queries are scheduled to execute, selecting, based on the respective execution cost, a query of the plurality of queries;
    rescheduling the selected query to execute during the period of time;
    detecting, based on the monitoring, a second period of time where no queries are scheduled to execute;
    in response to detecting the second period of time where no queries are scheduled to execute, selecting, based on the respective meta-data, a second query of the plurality of queries;
    determining that the second period of time fails to satisfy the data freshness sensitivity of the second query;
    in response to determining that the second period of time does not satisfy the data freshness sensitivity of the second query, selecting, based on the respective meta-data, a third query of the plurality of queries; and
    rescheduling the selected third query to execute during the second period of time.

2. The method of claim 1, wherein the respective execution cost is an amount of computing resources consumed in executing the respective query.

3. The method of claim 1, wherein the respective execution cost of the selected query is a largest execution cost of the plurality of queries.

4. The method of claim 3, wherein selecting the query comprises:
    determining that two or more queries of the plurality of queries have the largest execution cost; and
    determining a smallest data freshness sensitivity from the two or more queries of the plurality of queries.

5. The method of claim 1, wherein the operations further comprise determining that the respective execution cost of the selected query satisfies a threshold.

6. The method of claim 1, wherein the operations further comprises executing the selected query during the period of time.

7. The method of claim 1, wherein the operations further comprise determining that the second period of time satisfies the data freshness sensitivity of the selected third query.

8. A system comprising:
    data processing hardware; and
    memory hardware in communication with the data processing hardware, the memory hardware storing instructions that when executed on the data processing hardware cause the data processing hardware to perform operations comprising:
        monitoring a query processing schedule comprising a plurality of queries, each respective query of the plurality of queries:
            scheduled to execute against a database at a respective specified time;
            comprising respective meta-data defining a respective attribute of the respective query, the meta-data indicating:
                a respective execution cost of the respective query; and
                a data freshness sensitivity of the respective query, the data freshness sensitivity indicating a reliance on freshness of corresponding data of the database queried by the respective query;
        detecting, based on the monitoring of the query processing schedule, a period of time in the query processing schedule where no queries are scheduled to execute;
        in response to detecting the period of time where no queries are scheduled to execute, selecting, based on the respective execution cost, a query of the plurality of queries;
        rescheduling the selected query to execute during the period of time;
        detecting, based on the monitoring, a second period of time where no queries are scheduled to execute;
        in response to detecting the second period of time where no queries are scheduled to execute, selecting, based on the respective meta-data, a second query of the plurality of queries;
        determining that the second period of time fails to satisfy the data freshness sensitivity of the second query;
        in response to determining that the second period of time does not satisfy the data freshness sensitivity of the second query, selecting, based on the respective meta-data, a third query of the plurality of queries; and rescheduling the selected third query to execute during the second period of time.

9. The system of claim 8, wherein the respective execution cost is an amount of computing resources consumed in executing the respective query.

10. The system of claim 8, wherein the respective execution cost of the selected query is a largest execution cost of the plurality of queries.

11. The system of claim 10, wherein selecting the query comprises:
   determining that two or more queries of the plurality of queries have the largest execution cost; and
   determining a smallest data freshness sensitivity from the two or more queries of the plurality of queries.

12. The system of claim 8, wherein the operations further comprise determining that the respective execution cost of the selected query satisfies a threshold.

13. The system of claim 8, wherein the operations further comprises executing the selected query during the period of time.

14. The system of claim 8, wherein the operations further comprise determining that the second period of time satisfies the data freshness sensitivity of the selected third query.

* * * * *